(12) United States Patent
Imaizumi

(10) Patent No.: US 10,597,806 B2
(45) Date of Patent: *Mar. 24, 2020

(54) SEWING MACHINE AND NON-TRANSITORY COMPUTER-READABLE STORAGE MEDIUM

(71) Applicant: BROTHER KOGYO KABUSHIKI KAISHA, Nagoya-shi, Aichi-ken (JP)

(72) Inventor: Kazutaka Imaizumi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 71 days.

This patent is subject to a terminal disclaimer.

(21) Appl. No.: 15/975,901

(22) Filed: May 10, 2018

(65) Prior Publication Data

US 2018/0258568 A1    Sep. 13, 2018

Related U.S. Application Data

(63) Continuation of application No. PCT/JP2016/075797, filed on Sep. 2, 2016.

(30) Foreign Application Priority Data

Nov. 27, 2015  (JP) .................... 2015-232178

(51) Int. Cl.
*D05B 19/10* (2006.01)
*D05C 5/06* (2006.01)
(Continued)

(52) U.S. Cl.
CPC ............. *D05B 19/10* (2013.01); *D05B 19/08* (2013.01); *D05B 19/12* (2013.01); *D05B 19/14* (2013.01); *D05C 5/06* (2013.01); *G06T 7/74* (2017.01)

(58) Field of Classification Search
CPC ........ D05B 19/10; D05B 19/08; D05B 19/12; D05C 5/02; D05C 5/06
See application file for complete search history.

(56) References Cited

U.S. PATENT DOCUMENTS 5,880,963 A * 3/1999 Futamura ............... D05B 19/08
112/470.01
8,539,893 B2 * 9/2013 Tokura ................... D05B 19/12
112/102.5

(Continued)

FOREIGN PATENT DOCUMENTS

JP   2010-246885 A   11/2010
JP   2014-42706 A    3/2014

OTHER PUBLICATIONS

May 29, 2018 International Preliminary Report on Patentability issued in International Patent Application No. PCT/JP2016/075797.

(Continued)

*Primary Examiner* — Tajash D Patel
(74) *Attorney, Agent, or Firm* — Oliff PLC

(57) ABSTRACT

A sewing machine acquires embroidery data of an embroidery pattern including a first pattern to be sewn when a holding position of an embroidery frame is a first position and a second pattern to be sewn subsequent to the first pattern when the holding position is a second position. The sewing machine identifies an image capture area based on the embroidery data, and acquires first image data representing the image capture area and extracts a first feature point. And then, the sewing machine acquires second image data and extracts a second feature point. The sewing machine sets, based on the first feature point and the second image data, a layout of the second pattern with respect to the first pattern when the holding position is the second position and corrects the embroidery data. The sewing machine sews (Continued)

the second pattern on the sewing object based on the corrected embroidery data.

10 Claims, 10 Drawing Sheets

(51) Int. Cl.
  *D05B 19/12* (2006.01)
  *D05B 19/08* (2006.01)
  *D05B 19/14* (2006.01)
  *G06T 7/73* (2017.01)

(56) References Cited

U.S. PATENT DOCUMENTS

| | | | | |
|---|---|---|---|---|
| 8,612,046 B2* | 12/2013 | Tokura | ............... | D05B 19/10 |
| | | | | 112/475.19 |
| 8,869,721 B2* | 10/2014 | Suzuki | ............... | D05B 19/12 |
| | | | | 112/102.5 |
| 9,551,099 B2* | 1/2017 | Suzuki | ............... | D05B 19/12 |
| 2010/0242817 A1 | 9/2010 | Tokura | | |
| 2014/0060407 A1 | 3/2014 | Abe et al. | | |

OTHER PUBLICATIONS

Nov. 15, 2016 International Search Report issued in International Application No. PCT/JP2016/075797.

* cited by examiner

SEWING MACHINE AND NON-TRANSITORY COMPUTER-READABLE STORAGE MEDIUM

CROSS-REFERENCE TO RELATED APPLICATION

This application is a Continuation Application of International Application No. PCT/JP2016/075797, filed Sep. 2, 2016, which claims priority from Japanese Patent Application No. 2015-232178, filed on Nov. 27, 2015. This disclosure of the foregoing application is hereby incorporated by reference in its entirety.

BACKGROUND

The present disclosure relates to a sewing machine including an image capture portion, and to a non-transitory computer-readable storage medium.

A sewing machine capable of embroidery sewing normally uses an embroidery frame that holds a sewing object, and performs embroidery sewing within a sewable area that is set inside the embroidery frame in accordance with a type of the embroidery frame. In sewing machines of related art, a sewing machine is known which divides an embroidery pattern larger than the sewable area into a plurality of patterns smaller than the sewable area, and stores sewing data corresponding to the plurality of patterns. The sewing machine sequentially sews the plurality of divided patterns in accordance with the sewing data, and thus sews the embroidery pattern larger than the sewable area. Every time the sewing of one pattern of the plurality of divided patterns is completed, in order to sew the next pattern, a user changes a holding position of a work cloth, which is the sewing object, with respect to the embroidery frame. The above-described sewing machine includes an image capture portion, and before and after the holding position of the work cloth by the embroidery frame is changed, captures images of markers disposed on a surface of the work cloth. The sewing machine extracts a plurality of feature points from the captured images of the markers, and performs positioning between the plurality of divided patterns on the basis of each of the extracted feature points.

SUMMARY

In the known sewing machine, when the positioning between the plurality of patterns is performed using the captured images, it is necessary to capture an image of the whole sewable area in order to identify positions of the markers disposed on the sewing object. Therefore, it is necessary to extract the markers from the whole sewable area whose image has been captured, and this processing takes time. The markers are feature points used for positioning.

It is an object of the present disclosure to provide a sewing machine and a non-transitory computer-readable storage medium that are capable of reducing a time required to extract feature points used for positioning when positioning between a plurality of patterns is performed using captured images.

Various embodiments herein provide a sewing machine including an embroidery frame, an image capture portion, a processor and a memory. The embroidery frame is configured to hold a sewing object. The image capture portion has a predetermined image capture range. The memory is configured to store computer-readable instructions. When executed by the processor, the computer-readable instructions instruct the processor to perform processes. The processes include acquiring embroidery data representing an embroidery pattern. The embroidery pattern includes a first pattern and a second pattern. The first pattern is a pattern that is sewn in a state in which a holding position of the sewing object held by the embroidery frame is a first position. The second pattern is a pattern that is sewn subsequent to the first pattern in a state in which the holding position is a second position different from the first position. The processes further include identifying, as an image capture area, an area which includes at least a part of a first area and which is within the image capture range in the state in which the holding position is the first position. The first area is an area in which the first pattern is sewn on the basis of the acquired embroidery data. The processes further include causing the image capture portion to capture a first image representing the identified image capture area, and acquiring first image data representing the first image. The processes further include extracting a first feature point from the acquired first image data. The processes further include causing the image capture portion to capture a second image of the sewing object when the holding position is the second position after the first image data has been acquired, and acquiring second image data representing the second image. The processes further include extracting a second feature point from the acquired second image data. The processes further include setting, on the basis of the first feature point and the second feature point, a layout of the second pattern with respect to the first pattern when the holding position is the second position, and correcting the embroidery data to sew the second pattern in accordance with the set layout. The processes further include sewing the second pattern on the sewing object on the basis of the corrected embroidery data.

Various embodiments also provide a non-transitory computer-readable medium storing computer-readable instructions that are executed by a processor provided in a sewing machine comprising an embroidery frame to hold a sewing object and an image capture portion having a predetermined image capture range. When executed by the processor, the computer-readable instructions instruct the processor to perform processes. The processes include acquiring embroidery data representing an embroidery pattern. The embroidery pattern includes a first pattern and a second pattern. The first pattern is a pattern that is sewn in a state in which a holding position of the sewing object held by the embroidery frame is a first position. The second pattern is a pattern that is sewn subsequent to the first pattern in a state in which the holding position is a second position different from the first position. The processes further include identifying, as an image capture area, an area which includes at least a part of a first area and which is within the image capture range in the state in which the holding position is the first position. The first area is an area in which the first pattern is sewn on the basis of the acquired embroidery data. The processes further include causing the image capture portion to capture a first image representing the identified image capture area, and acquiring first image data representing the first image. The processes further include extracting a first feature point from the acquired first image data. The processes further include causing the image capture portion to capture a second image of the sewing object when the holding position is the second position after the first image data has been acquired, and acquiring second image data representing the second image. The processes further include extracting a second feature point from the acquired second image data. The processes further include setting, on the basis of the first feature point and the second feature point, a layout of the second pattern with respect to the first pattern when the holding position is the second position, and correcting the embroidery data to sew the second pattern in accordance with the set layout. The processes further include sewing the second pattern on the sewing object on the basis of the corrected embroidery data.

BRIEF DESCRIPTION OF THE DRAWINGS

Embodiments of the disclosure will be described below in detail with reference to the accompanying drawings in which.

DETAILED DESCRIPTION OF EMBODIMENTS

An embodiment of the present disclosure will be explained with reference to the drawings. Note that the drawings are used to explain technological features that can be adopted by the present disclosure and are not intended to limit the content. A physical configuration of a sewing machine 1 will be explained with reference to FIG. 1 and FIG. 2. The up-down direction, the lower right side, the upper left side, the lower left side and the upper right side of FIG. 1 respectively correspond to the up-down direction, the front side, the rear side, the left side and the right side of the sewing machine 1. More specifically, a surface on which a liquid crystal display (hereinafter referred to as an LCD) 15 is disposed is the front surface of the sewing machine 1. The longitudinal direction of a bed portion 11 and an arm portion 13 is the left-right direction of the sewing machine 1, and the side on which a pillar 12 is disposed is the right side. The extending direction of the pillar 12 is the up-down direction of the sewing machine 1.

Figure 1:
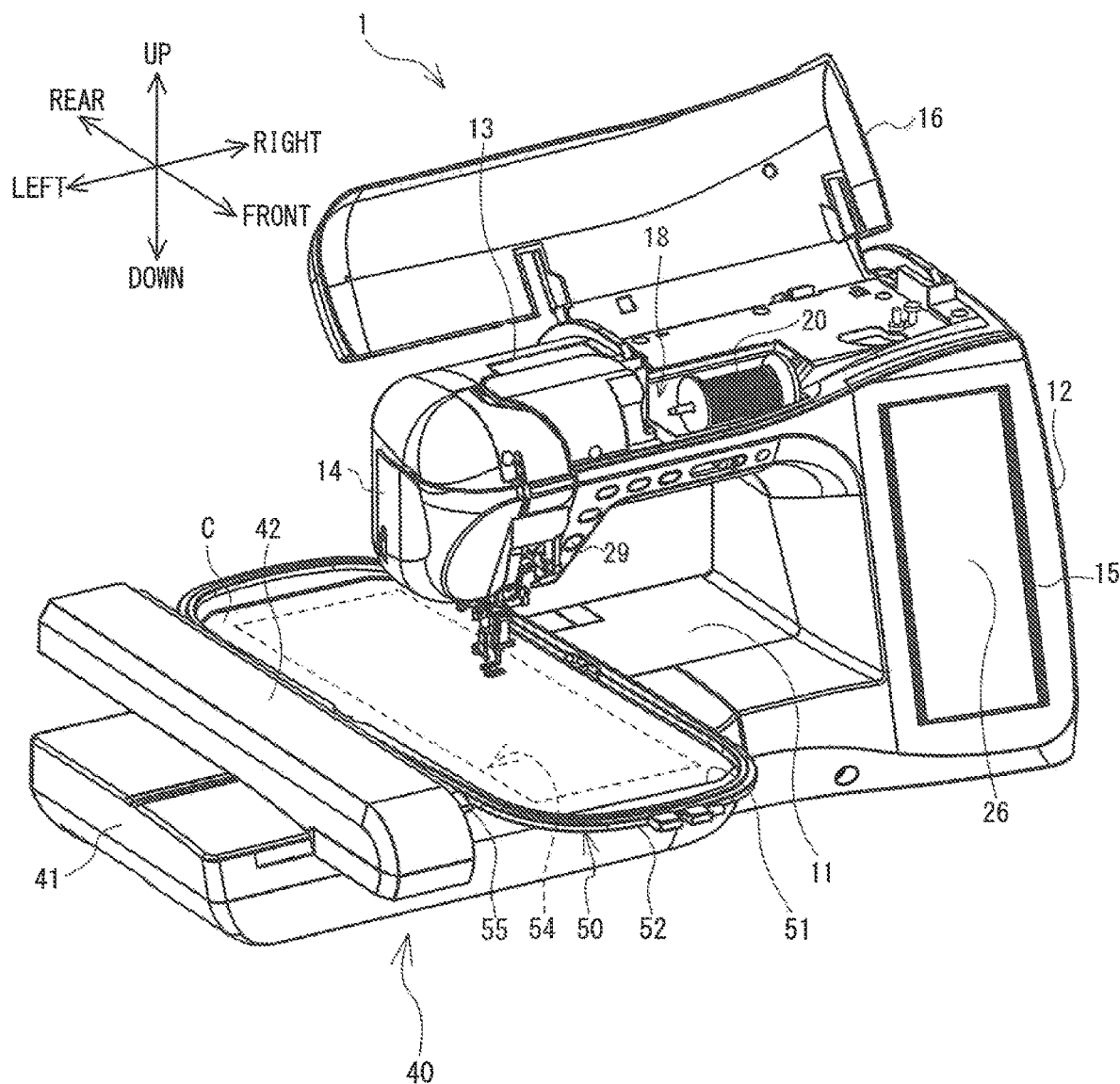
FIG. 1 is a perspective view of a sewing machine 1.

As shown in FIG. 1, the sewing machine 1 is provided with the bed portion 11, the pillar 12, the arm portion 13 and a head portion 14. The bed portion 11 is a base portion of the sewing machine 1 and extends in the left-right direction. The pillar 12 is provided so as to extend upward from the right end portion of the bed portion 11. The arm portion 13 faces the bed portion 11 and extends to the left from the upper end of the pillar 12. The head portion 14 is coupled to the left leading end portion of the arm portion 13.

Figure 2:
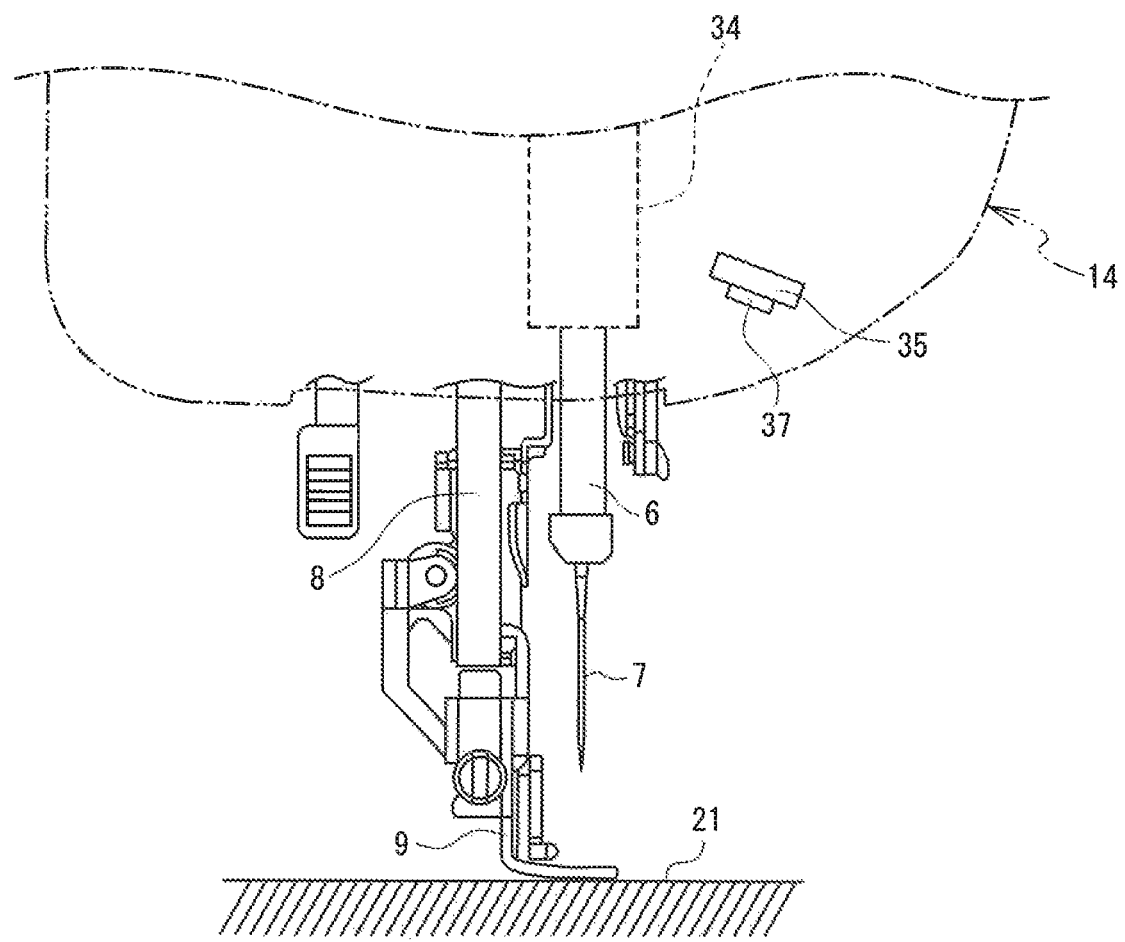
FIG. 2 is an explanatory diagram showing a configuration of the lower end portion of a head portion 14.

The upper surface of the bed portion 11 is provided with a needle plate 21 (refer to FIG. 2). The needle plate 21 has a needle hole (not shown in the drawings) through which a sewing needle 7 can be inserted. A sewing object (for example, a work cloth) not shown in the drawings is placed on the upper surface of the needle plate 21. A feed dog, a feed mechanism, a shuttle mechanism and the like, which are not shown in the drawings, are provided below the needle plate 21, namely, inside the bed portion 11 of the sewing machine 1. When normal sewing that is not embroidery sewing is performed, the feed dog is driven by the feed mechanism and moves the sewing object by a predetermined movement amount. The shuttle mechanism entwines an upper thread (not shown in the drawings) with a lower thread (not shown in the drawings) below the needle plate 21.

The sewing machine 1 is provided with a movement mechanism 40. The movement mechanism 40 can relatively move a sewing object C (an object to be photographed), which is held by an embroidery frame 50, with respect to an image sensor 35 and a needle bar 6. The movement mechanism 40 is provided with a main body portion 41 and a carriage 42. The carriage 42 is provided with a frame holder (not shown in the drawings), a Y axis movement mechanism (not shown in the drawings) and a Y axis motor 84 (refer to FIG. 3). The frame holder is provided on the right side surface of the carriage 42. The single embroidery frame 50 selected from among a plurality of types of embroidery frames, whose sizes and shapes are different from each other, can be mounted on and removed from the frame holder. The Y axis movement mechanism causes the frame holder to move in the front-rear direction (a Y axis direction). The Y axis motor 84 drives the Y axis movement mechanism.

The embroidery frame 50 of the present embodiment has a first frame member 51, a second frame member 52 and an attachment portion 55, and the sewing object C can be held by the first frame member 51 and the second frame member 52. A sewable area 54, which is set inside the embroidery frame 50 in accordance with the type of the embroidery frame, is an area in which the sewing machine 1 can form stitches. The attachment portion 55 is mounted on the frame holder. The attachment portion 55 has a shape specific to the embroidery frame 50. When the embroidery frame 50 is mounted on the frame holder of the movement mechanism 40, on the basis of the shape of the attachment portion 55 detected by a detector 36 (refer to FIG. 3), the sewing machine 1 can determine that the embroidery frame 50 has been mounted on the sewing machine 1, and can identify the type of the mounted embroidery frame 50.

Figure 3:
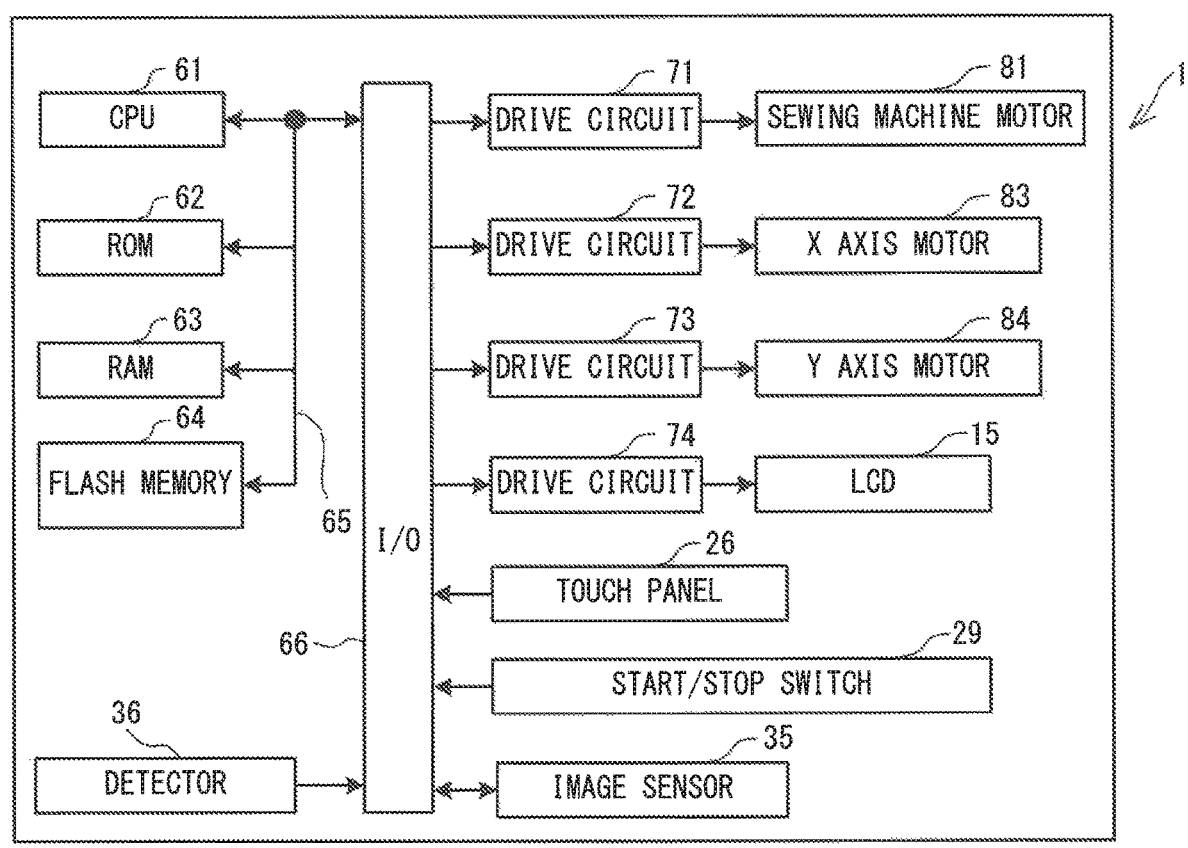
FIG. 3 is a block diagram showing an electrical configuration of the sewing machine 1.

The main body portion 41 is internally provided with an X axis movement mechanism (not shown in the drawings) and an X axis motor 83 (refer to FIG. 3). The X axis movement mechanism causes the carriage 42 to move in the left-right direction (an X axis direction). The X axis motor 83 drives the X axis movement mechanism. The movement mechanism 40 can move the embroidery frame 50 mounted on the carriage 42 (more specifically, on the frame holder) to a position indicated by an XY coordinate system (an embroidery coordinate system) specific to the embroidery frame 50. In the embroidery coordinate system, for example, the right side, the left side, the front side and the rear side of the sewing machine 1 respectively correspond to an X plus direction, an X minus direction, a Y minus direction and a Y plus direction.

The LCD 15 is provided on the front surface of the pillar 12. The LCD 15 displays an image including various items, such as commands, illustrations, setting values and messages. A touch panel 26, which can detect a pressed position, is provided on the front surface side of the LCD 15. When a user performs a pressing operation of the touch panel 26 using a finger or a stylus pen (not shown in the drawings), the touch panel 26 detects the pressed position. On the basis of the detected pressed position, a CPU 61 (refer to FIG. 3) of the sewing machine 1 recognizes an item selected in the image. Hereinafter, the pressing operation of the touch panel 26 by the user is referred to as a panel operation. By performing the panel operation, the user can select a pattern to be sewn, a command to be executed, and the like. The pillar 12 is internally provided with a sewing machine motor 81 (refer to FIG. 3).

An upper portion of the arm 13 is provided with a cover 16 that can open and close. FIG. 1 shows the sewing machine 1 when the cover 16 is in an open state. A thread housing portion 18 is provided below the cover 16 (namely, inside the arm portion 13). The thread housing portion 18 can house a thread spool 20 around which the upper thread is wound. A drive shaft (not shown in the drawings) that extends in the left-right direction is provided inside the arm portion 13. The drive shaft is rotationally driven by the sewing machine motor 81. Various types of switches, including a start/stop switch 29, are provided on a lower left portion of the front surface of the arm portion 13. The start/stop switch 29 is used to start or stop the operation of the sewing machine 1. More specifically, the start/stop switch 29 is used to input a sewing start command or a sewing end command.

As shown in FIG. 2, the head portion 14 is provided with the needle bar 6, a presser bar 8, a needle bar up-and-down movement mechanism 34 and the like. The sewing needle 7 is detachably mounted on the lower end of the needle bar 6. A presser foot 9 is detachably attached to the lower end portion of the presser bar 8. The needle bar 6 is provided at the lower end of the needle bar up-and-down movement mechanism 34. The needle bar up-and-down movement mechanism 34 causes the needle bar 6 to be driven in the up-down direction by the rotation of the drive shaft.

The image sensor 35 having a predetermined image capture range is provided inside the head portion 14. The image sensor 35 is, for example, a well-known complementary metal oxide semiconductor (CMOS) image sensor. The image sensor 35 is a known area sensor in which a plurality of image pickup elements 37 (for example, a plurality of CMOS) aligned in a main scanning direction are arranged in a plurality of rows in a sub-scanning direction. In the present embodiment, the main scanning direction and the sub-scanning direction respectively correspond to the X axis direction (the left-right direction) and the Y axis direction (the front-rear direction) of the sewing machine 1.

Figure 4:
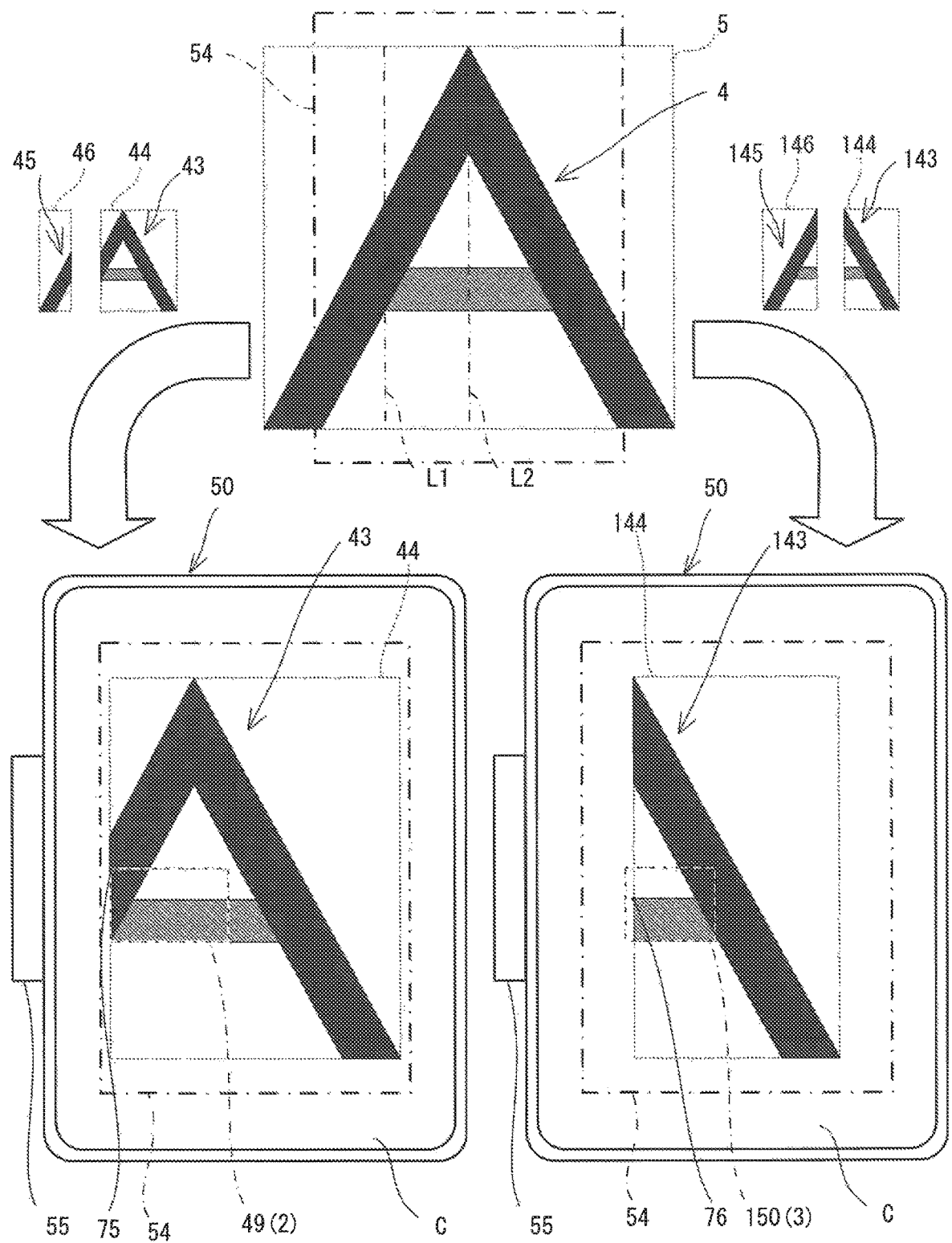
FIG. 4 is an explanatory diagram of an embroidery pattern 4 that is larger than a sewable area 54, a first specific example in which the embroidery pattern 4 is divided into a first pattern 43 and a second pattern 45, and a second specific example in which the embroidery pattern 4 is divided into a first pattern 143 and a second pattern 145.

A whole range that is captured by the image sensor 35 in a single image capture is referred to as an image capture range 2 (refer to FIG. 4). In the image sensor 35 of the present embodiment, the number of the image pickup elements 37 aligned in the main scanning direction is larger than the number of the image pickup elements 37 aligned in the sub-scanning direction. In other words, the number of pixels in the main scanning direction is larger than the number of pixels in the sub-scanning direction. As a result, the image capture range 2 has a rectangular shape that is longer in the main scanning direction than in the sub-scanning direction. As an example, the image sensor 35 of the present embodiment is an area sensor in which 1280 pixels are arranged in the main scanning direction and 720 pixels are arranged in the sub-scanning direction.

The image sensor 35 is disposed such that it can capture a range including an area below the needle bar 6, and can generate image data. The generated image data is stored in a predetermined storage area of a RAM 63 (refer to FIG. 3). A coordinate system of an image (hereinafter also referred to as an "image coordinate system") represented by the image data generated by the image sensor 35 and a coordinate system of a whole space (hereinafter also referred to as a "world coordinate system") are associated with each other in advance using parameters stored in a flash memory 64 (refer to FIG. 3). The world coordinate system and the embroidery coordinate system are associated with each other in advance using the parameters stored in the flash memory 64. Thus, the sewing machine 1 can perform processing that identifies coordinates of the embroidery coordinate system on the basis of the image data generated by the image sensor 35.

An electrical configuration of the sewing machine 1 will be explained with reference to FIG. 3. The sewing machine 1 is provided with the CPU 61, a ROM 62, the RAM 63, the flash memory 64 and an input/output (I/O) interface 66. The CPU 61 is connected to the ROM 62, the RAM 63, the flash memory 64 and the I/O interface 66, via a bus 65.

The CPU 61 performs overall control of the sewing machine 1 and performs various types of calculations and processing that relate to image capture and sewing, in accordance with various programs stored in the ROM 62. The ROM 62 is provided with a plurality of storage areas (not shown in the drawings) including a program storage area. The various programs (including a program to execute main processing) to operate the sewing machine 1 are stored in the program storage area.

The RAM 63 is provided with a storage area to store calculation results etc. obtained by the CPU 61 performing arithmetic processing. The flash memory 64 stores various parameters etc. for the sewing machine 1 to perform various types of processing. Drive circuits 71 to 74, the touch panel 26, the start/stop switch 29, the image sensor 35 and the detector 36 are connected to the I/O interface 66. The detector 36 detects that the embroidery frame 50 has been mounted on the movement mechanism 40, and outputs a detection result corresponding to the type of the embroidery frame 50.

The drive circuit 71 is connected to the sewing machine motor 81. The drive circuit 71 drives the sewing machine motor 81 in accordance with a control signal from the CPU 61. When the sewing machine motor 81 is driven, the needle bar up-and-down movement mechanism 34 (refer to FIG. 2) is driven via the drive shaft (not shown in the drawings) of the sewing machine 1, and the needle bar 6 moves up and down. The drive circuit 72 is connected to the X axis motor 83. The drive circuit 73 is connected to the Y axis motor 84. The drive circuits 72 and 73 drive the X axis motor 83 and the Y axis motor 84, respectively, in accordance with a control signal from the CPU 61. When the X axis motor 83 and the Y axis motor 84 are driven, the embroidery frame 50 mounted on the movement mechanism 40 moves in the left-right direction (the X axis direction) and the front-rear direction (the Y axis direction) by a movement amount corresponding to the control signal. The drive circuit 74 drives the LCD 15 in accordance with a control signal from the CPU 61, and causes an image to be displayed on the LCD 15.

Operations of the sewing machine 1 will be explained briefly. When embroidery sewing is performed using the embroidery frame 50, the needle bar up-and-down movement mechanism 34 (refer to FIG. 2) and the shuttle mechanism (not shown in the drawings) are driven in combination with the embroidery frame 50 being moved in the X axis direction and the Y axis direction by the movement mechanism 40. Thus, an embroidery pattern is sewn on the sewing object C held by the embroidery frame 50, using the sewing needle 7 mounted on the needle bar 6.

An embroidery pattern 4 of a first specific example and a second specific example that can be sewn by the sewing machine 1 will be explained with reference to FIG. 4. In the course of the sewing, the sewing machine 1 changes a holding position of the sewing object C by the embroidery frame 50. Thus, the sewing machine 1 can sew the embroidery pattern 4 larger than the sewable area 54 that corresponds to the embroidery frame 50. Hereinafter, "the holding position of the sewing object C by the embroidery frame 50" will be simply referred to as the "holding position." The embroidery pattern larger than the sewable area 54 may be a pattern obtained by a single embroidery pattern being divided into a plurality of partial patterns so as to fall within the sewable area 54. Further, the embroidery pattern may be an embroidery pattern larger than the sewable area 54 as a whole, as a result of combining a plurality of embroidery patterns that fall within the sewable area 54.

The embroidery pattern 4 exemplified as the first specific example and the second specific example is a character pattern representing the alphabet capital letter A that is sewn using two colors of thread. The embroidery pattern 4 is sewn such that an inverted V-shaped portion is sewn using a first color thread, and a line segment portion that extends in the left-right direction in FIG. 4 is sewn by a second color thread. The embroidery pattern 4 is larger than the sewable area 54 of the embroidery frame 50. The embroidery pattern 4 includes a first pattern and a second pattern. The first pattern is sewn in a state in which the holding position is a first position. The second pattern is sewn, after the first pattern, in a state in which the holding position is a second position different from the first position. Each of the first pattern and the second pattern may be set in advance for the embroidery pattern 4. Alternatively, at a time point at which the size of the embroidery pattern 4 is ascertained, the first pattern and the second pattern may be set by dividing the embroidery pattern 4 larger than the sewable area 54 into a plurality of partial patterns. The size of the embroidery pattern 4 is represented by a minimum rectangle 5 that encompasses the embroidery pattern 4. Four sides of the minimum rectangle 5 are respectively parallel to an X direction and a Y direction of the embroidery coordinate system. An area surrounded by the minimum rectangle 5 is referred to as a pattern area. A boundary (hereinafter referred to as a pattern boundary) between the first pattern and the second pattern of the present example is set parallel to the X direction or the Y direction. Of two areas obtained by dividing the pattern area by the pattern boundary, an area including the first pattern is also referred to as a first area, and an area including the second pattern is also referred to as a second area. The first area represents the size of the first pattern. The second area represents the size of the second pattern.

The position of the pattern boundary with respect to the pattern area is different between the first specific example and the second specific example. In the first specific example, a line segment L1 in the pattern area of the embroidery pattern 4 is set as the pattern boundary. The line segment L1 is parallel to the Y axis and passes on the X minus side of the center of the pattern area in the X direction. The embroidery pattern 4 of the first specific example includes a first pattern 43 and a second pattern 45. A first area 44 including the first pattern 43 is a minimum rectangle that encompasses the first pattern 43. A second area 46 including the second pattern 45 is not a minimum rectangle that encompasses the second pattern 45. In the second specific example, a line segment L2 in the pattern area of the embroidery pattern 4 is set as the pattern boundary. The line segment L2 is parallel to the Y axis and passes the center of the pattern area in the X direction. The embroidery pattern 4 of the second specific example includes a first pattern 143 and a second pattern 145. A first area 144 including the first pattern 143 is a minimum rectangle that encompasses the first pattern 143. A second area 146 including the second pattern 145 is a minimum rectangle that encompasses the second pattern 145.

Sewing data to sew the embroidery pattern 4 includes first data to sew the first pattern and second data to sew the second pattern. Each of the first data and the second data includes coordinate data for each of thread color data. The thread color data represents a color of the thread to form stitches. The coordinate data indicates coordinates of the embroidery coordinate system representing formation positions (needle drop positions) of one or more stitches included in the embroidery pattern. Each of the first area and the second area can be identified on the basis of the sewing data.

With reference to FIG. 5 to FIG. 10, the main processing that is performed by the sewing machine 1 will be explained using the above-described first specific example and second specific example. In the main processing, a layout of the second pattern is set with respect to the first pattern, and processing is performed to sew the second pattern in accordance with the set layout. The main processing is activated when an embroidery pattern including the first pattern and the second pattern is selected as a sewing target embroidery pattern and processing to sew the first pattern on the sewing object C held by the embroidery frame 50 is completed. In other words, at the start of the main processing, the sewing of the first pattern is already completed and the embroidery frame 50 has been mounted on the movement mechanism 40 in a state in which the embroidery frame 50 holds the sewing object C at the first position. At the start of the main processing, in the first specific example, the first pattern 43 has been sewn on the sewing object C held at the first position, as shown by a lower left section of FIG. 4. In the second specific example, the first pattern 143 has been sewn on the sewing object C held at the first position, as shown by a lower right section of FIG. 4. In the description below, for explanatory convenience, the first specific example and the second specific example are explained in parallel. However, the main processing in the first specific example and the main processing in the second specific example are performed at mutually different timings.

When the embroidery pattern including the first pattern and the second pattern is to be sewn, when the CPU 61 detects that the sewing of the first pattern is completed, the CPU 61 reads out, to the RAM 63, the program to execute the main processing stored in the program storage area of the ROM 62. In accordance with instructions included in the program read out to the RAM 63, the CPU 61 performs the following steps. Various parameters necessary to perform the main processing are stored in the flash memory 64. Various data obtained in the course of the main processing are stored in the RAM 63, as appropriate.

Figure 5:
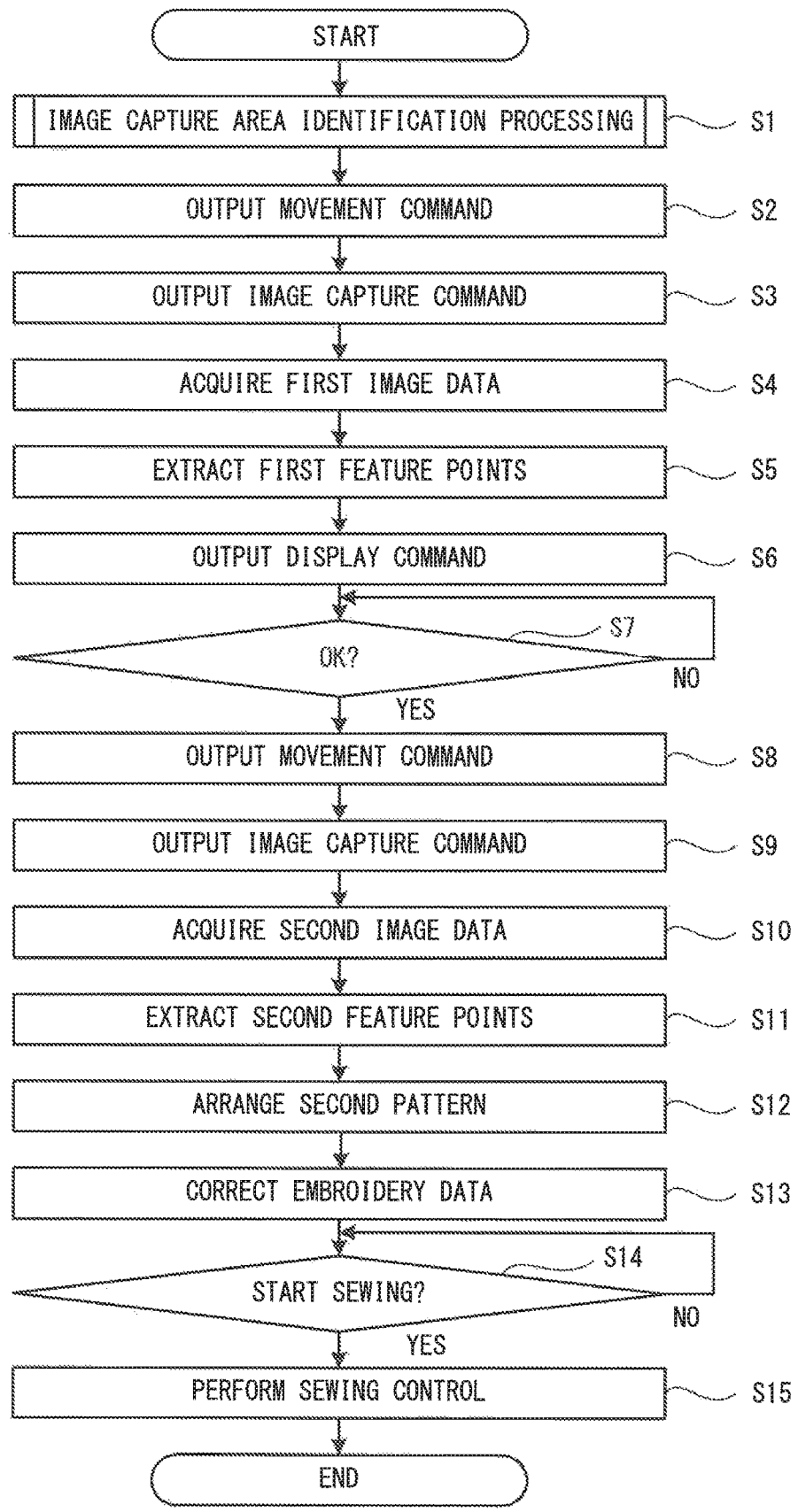
FIG. 5 is a flowchart of main processing.
Figure 6:
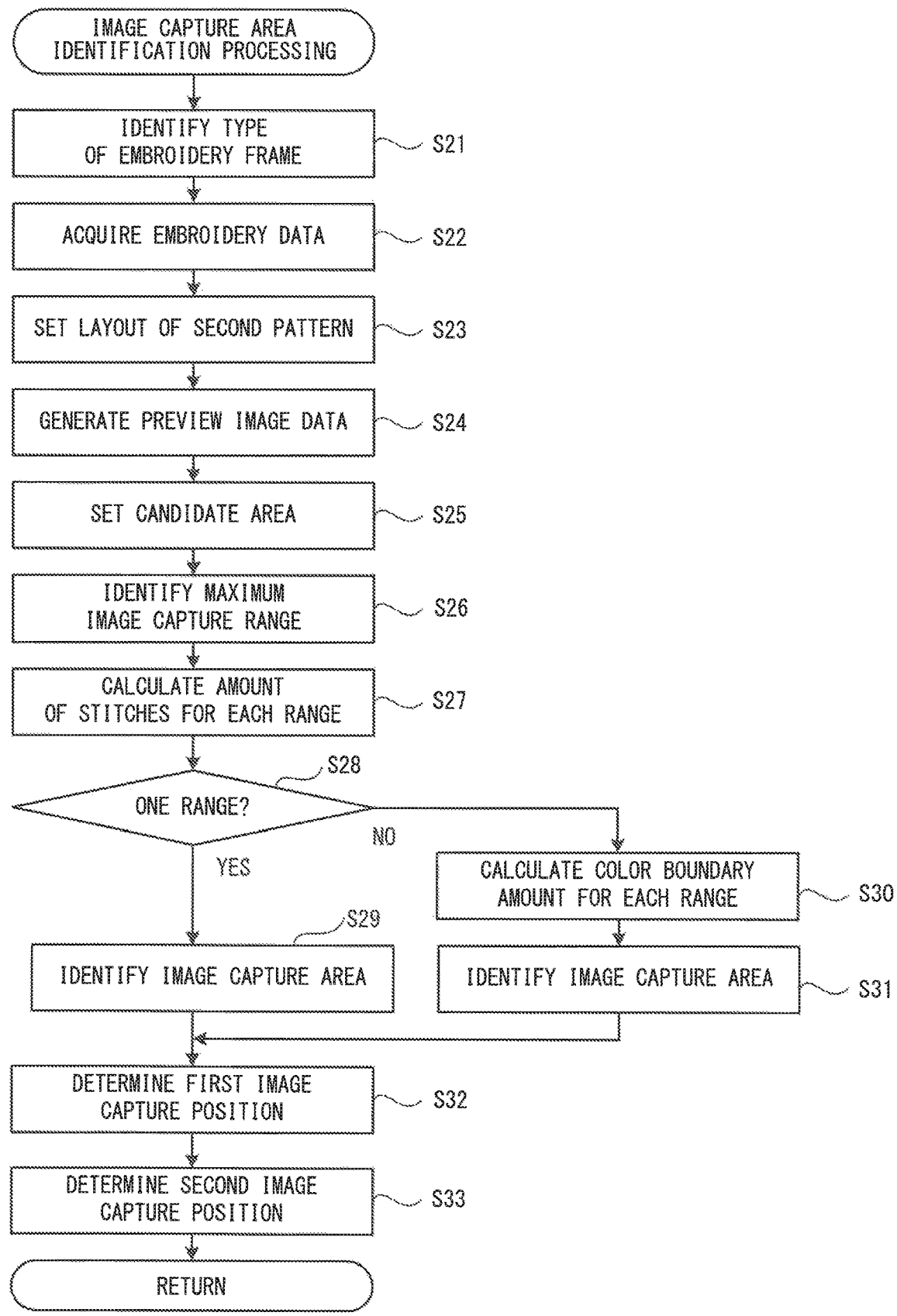
FIG. 6 is a flowchart of image capture area identification processing that is performed in the main processing in FIG. 5.

As shown in FIG. 5, the CPU 61 performs image capture area identification processing (step S1). On the basis of the embroidery data representing the embroidery pattern, the image capture area identification processing identifies, as an image capture area, an area which includes at least a part of the first area in which the first pattern has been sewn, and which is within the image capture range 2 in the state in which the holding position is the first position. As shown in FIG. 6, in the image capture area identification processing, the CPU 61 identifies the sewable area 54 corresponding to the type of the embroidery frame 50 mounted on the movement mechanism 40, on the basis of an output signal from the detector 36 (step S21). Relationships between embroidery frame types and sewable areas are stored in the flash memory 64. The sewable area of the present example is a rectangular area set inside the embroidery frame. The CPU 61 refers to the flash memory 64 and sets the sewable area 54 with respect to the embroidery frame 50. The CPU 61 acquires the embroidery data representing the embroidery pattern 4 (step S22). The embroidery data of the present example includes pattern image data and coordinate data. The pattern image data is image data representing the first pattern, and the coordinate data represents the layout of the second pattern with respect to the first pattern and positions of the needle drop points to form stitches of the embroidery pattern (the second pattern). The embroidery data of the present example further includes the thread color data representing the color of the upper thread used to sew the embroidery pattern, and the coordinate data is generated for each of the thread color data. In other words, the embroidery data of the present example includes the sewing data. The CPU 61 of the present example identifies the image capture area on the basis of the pattern image data and the layout of the second pattern with respect to the first pattern.

The CPU 61 sets the layout of the second pattern when the holding position is the second position, on the basis of the sewable area 54 identified at step S21 and the embroidery data acquired at step S22 (step S23). Using the following procedure, the CPU 61 of the present example sets the layout of the second pattern when the holding position is the second position. The CPU 61 determines the layout of the second pattern and the first pattern with respect to the embroidery frame 50 when the holding position is the second position, on the basis of the type of the embroidery frame 50 identified at step S21, the size of the second pattern represented by the embroidery data acquired at step S22, and the layout of the second pattern with respect to the first pattern. The size of the second pattern of the present example is defined as the size of the second area identified on the basis of the coordinate data. Specifically, the CPU 61 identifies the position of the pattern boundary with respect to the second pattern. In each of the first specific example and the second specific example, the pattern boundary is the side of the rectangular second area on the X plus side. The CPU 61 sets a margin area 57, which is a margin assigned to the inside of the sewable area 54 identified at step S21. The margin is not provided on the side on which the pattern boundary of the second area of the sewable area 54 is present, namely, on the X plus side, and is provided on the X minus side, the Y plus side and the Y minus side of the sewable area 54. The size of the margin is a predetermined value M1. The predetermined value M1 is set, as appropriate, while taking into consideration an attachment accuracy of the sewing object C with respect to the embroidery frame 50 by the user. The predetermined value M1 may be the same value on the X minus side, the Y plus side and the Y minus side, or may be mutually different values.

The CPU 61 sets the position of the second pattern in the X direction such that an end portion of the second pattern on the side opposite to the side on which the pattern boundary of the second area is present, namely, an end portion of the second pattern on the X minus side, matches an end portion of the margin area 57 on the X minus side. The CPU 61 sets the position of the second pattern in the Y direction such that the center of the second area in the Y direction matches the center of the margin area 57 in the Y direction. In the first specific example, as shown by the drawing on the left side of FIG. 7, the second pattern 45 is arranged with respect to the sewable area 54 and the margin area 57. In the second specific example, as shown by the drawing on the left side of FIG. 8, the second pattern 145 is arranged with respect to the sewable area 54 and the margin area 57.

Figure 8:
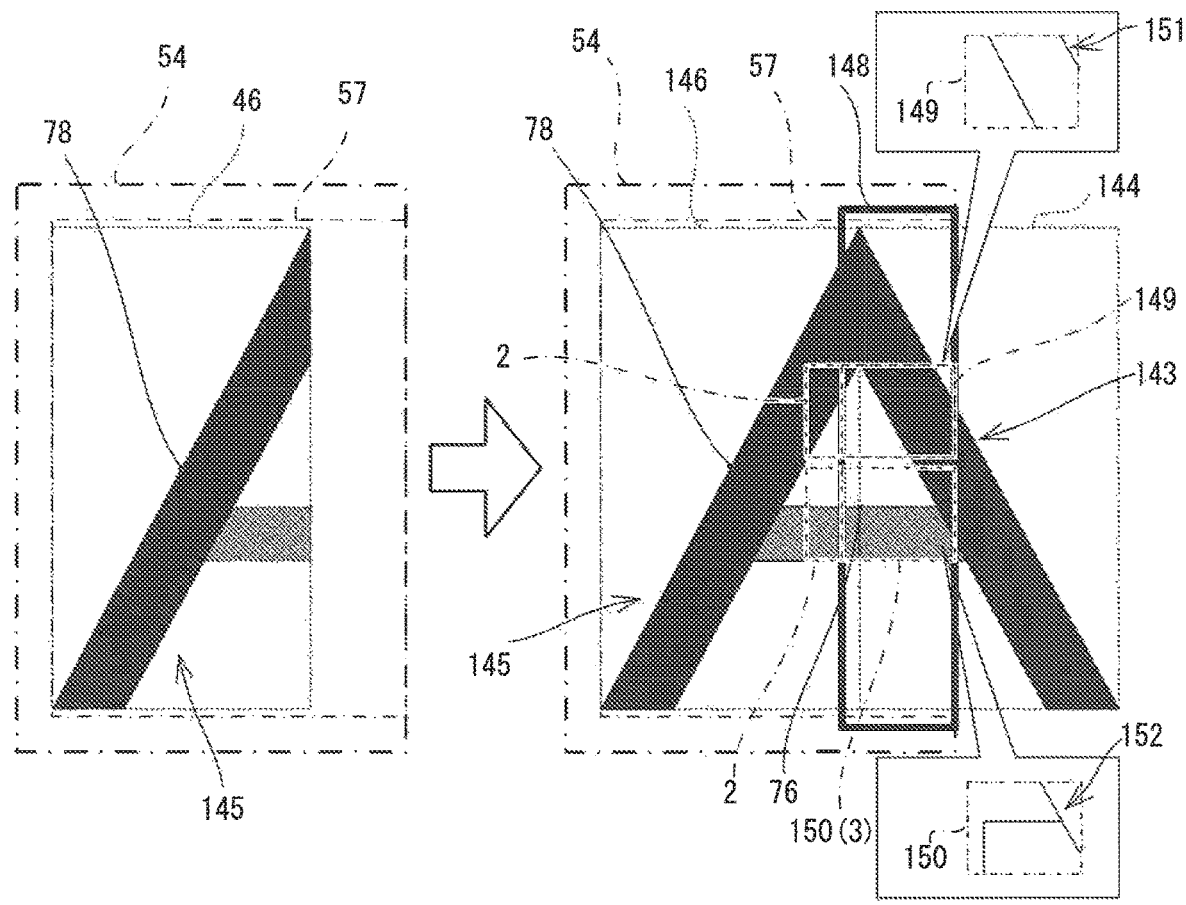
FIG. 8 is an explanatory diagram of processing that sets a layout of the second pattern 145 when the holding position of the sewing object C with respect to the embroidery frame 50 is the second position in the second specific example, and processing that identifies an area 150.
Figure 9:
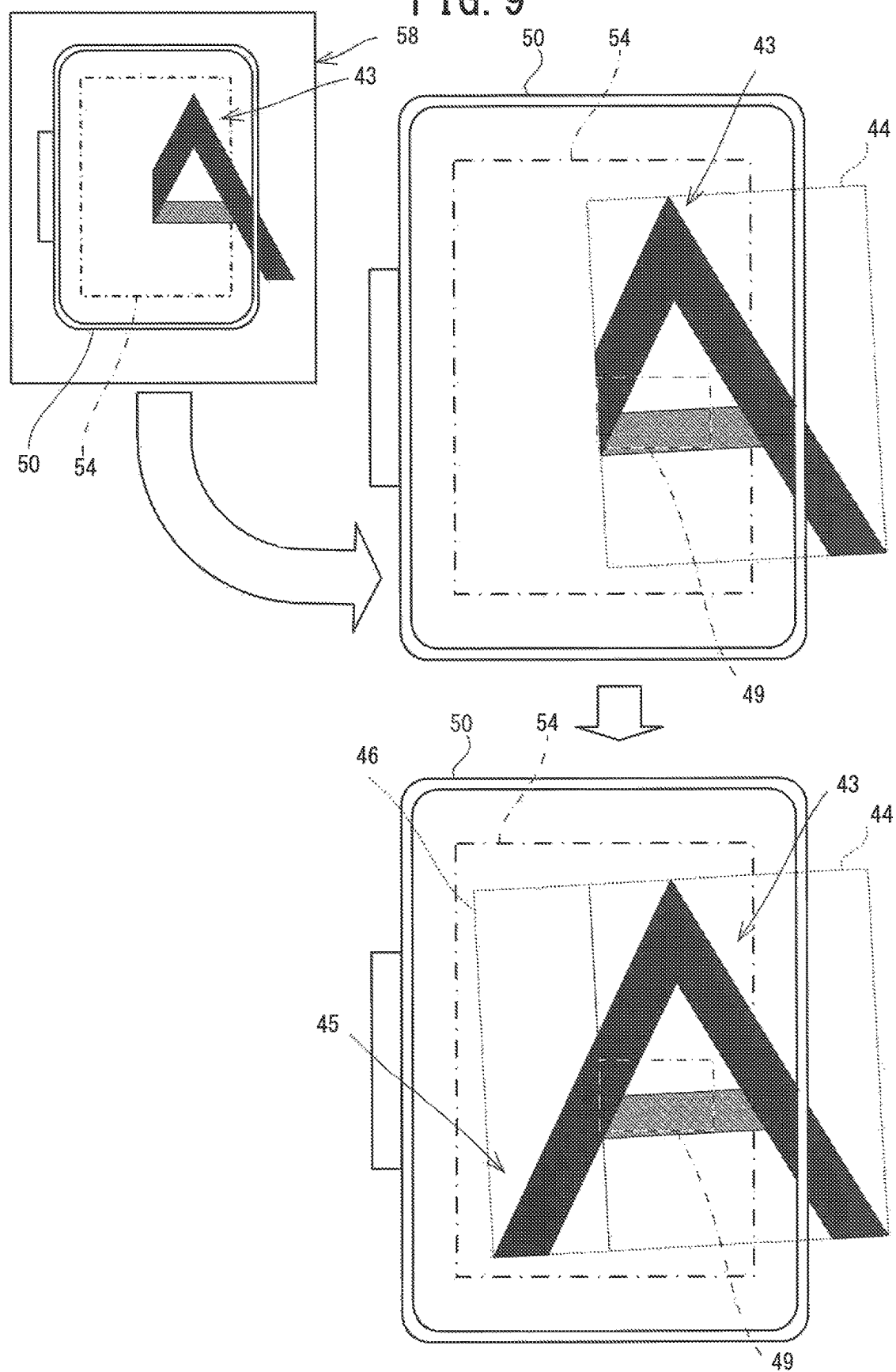
FIG. 9 is an explanatory diagram of processing that sets a layout of the second pattern 45 with respect to the first pattern 43 in the second position, in the first specific example.
Figure 10:
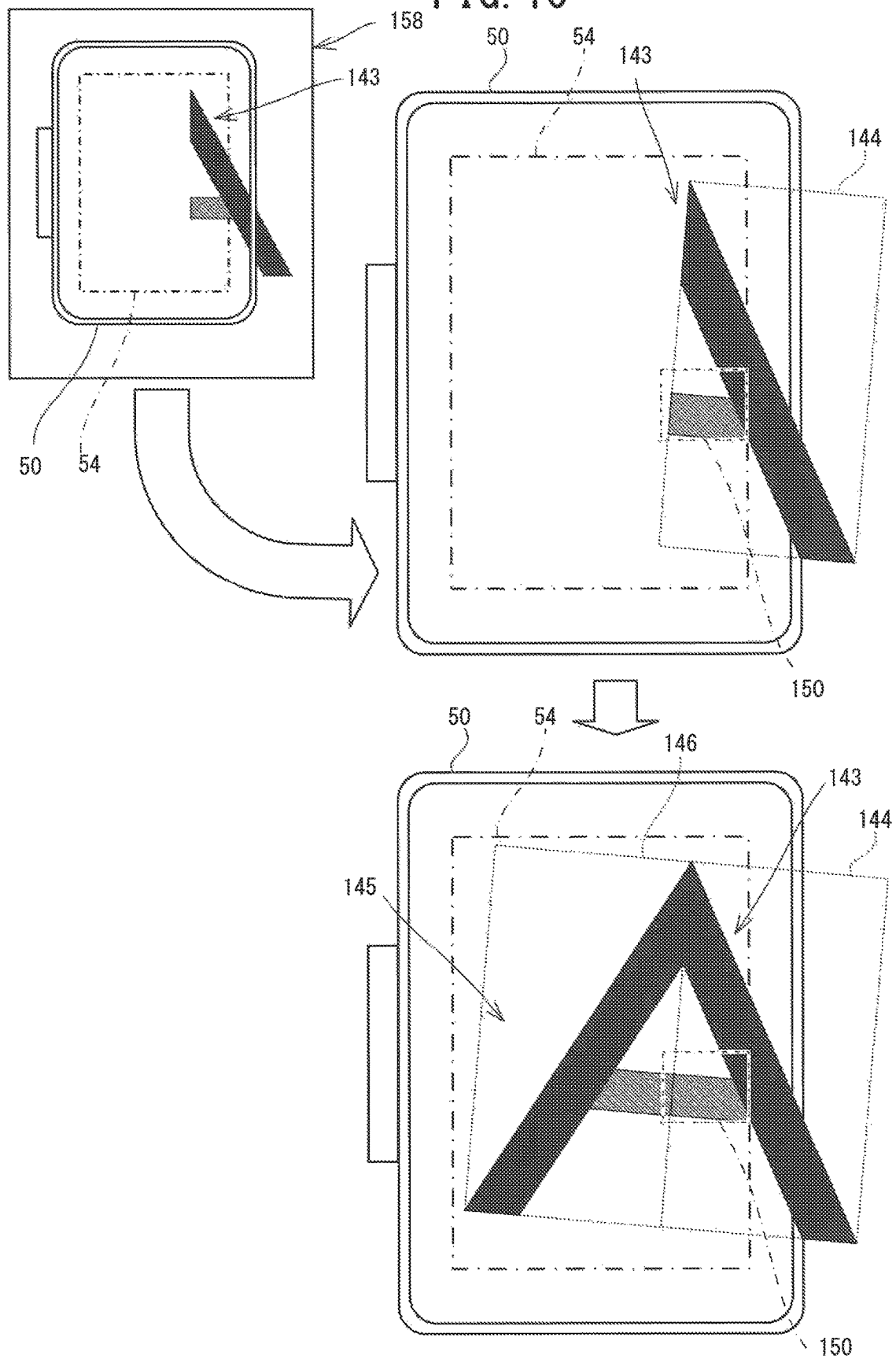
FIG. 10 is an explanatory diagram of processing that sets a layout of the second pattern 145 with respect to the first pattern 143 in the second position, in the second specific example.

The CPU 61 generates preview image data (step S24). The preview image data represents the layout of the first pattern with respect to the embroidery frame 50 (the sewable area 54) when the first pattern is arranged to match the layout of the second pattern set at step S23. The preview image data is set on the basis of the pattern image data representing the first pattern included in the embroidery data acquired at step S22, and the layout of the second pattern set at step S23. In the first specific example, as shown by the drawing on the right side of FIG. 7, the first pattern 43 is arranged with respect to the second pattern 45. In the first specific example, the image data representing an image 58 in FIG. 9 is generated. In the second specific example, as shown by the drawing on the right side of FIG. 8, the first pattern 143 is arranged with respect to the second pattern 145. In the second specific example, the image data representing an image 158 in FIG. 10 is generated. The image 58 includes the embroidery frame 50 and a part of the first pattern 43 when the sewing object C is held at the second position. The image 158 includes the embroidery frame 50 and a part of the first pattern 143 when the sewing object C is held at the second position. The images 58 and 158 may or may not include an image of the sewable area 54.

Figure 7:
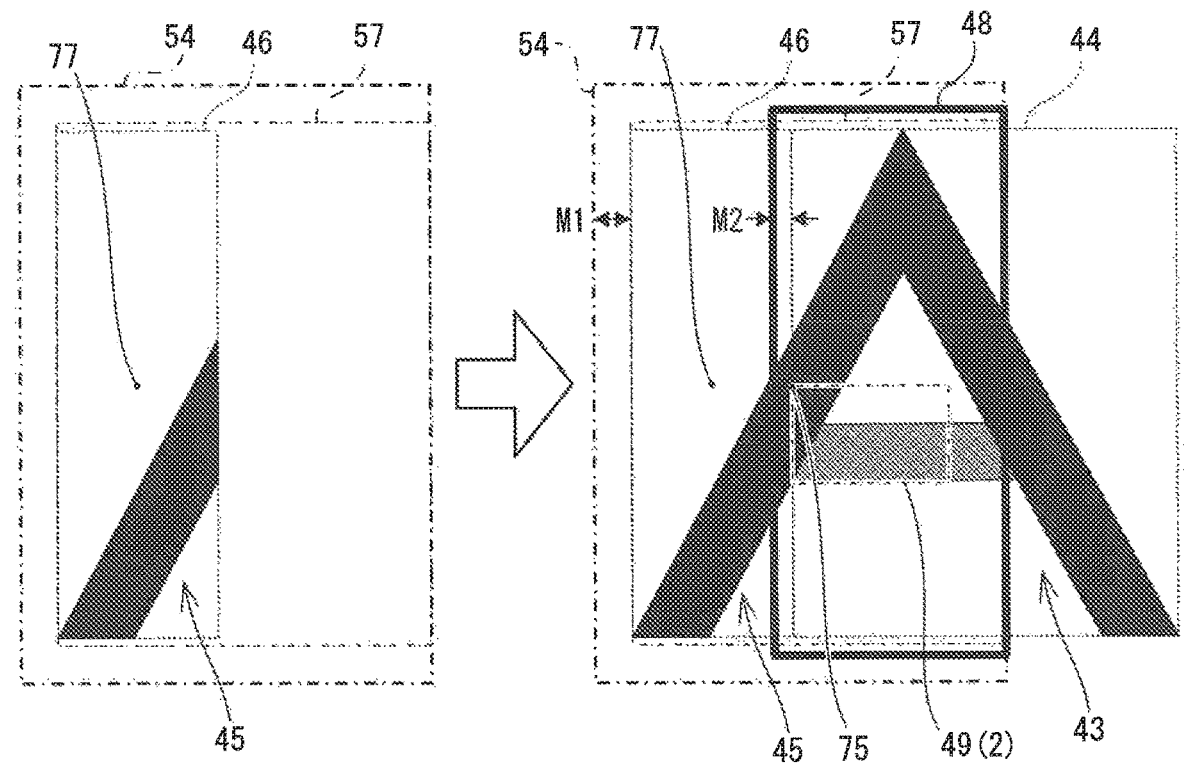
FIG. 7 is an explanatory diagram of processing that sets a layout of the second pattern 45 when a holding position of a sewing object C with respect to an embroidery frame 50 is a second position in the first specific example, and processing that identifies an area 49.

The CPU 61 sets a candidate area that becomes a candidate for the image capture area (step S25). The CPU 61 of the present example sets, as the candidate area, an area which includes a part of the first pattern and which falls within an area that can be captured by the image sensor 35 when the first pattern is arranged with respect to the embroidery frame 50 in accordance with the setting at step S23. On the basis of the embroidery data acquired at step S22, the CPU 61 of the present example sets an area which includes a part of the first pattern on the second pattern side and which is wider than the image capture range 2, as the candidate area that becomes a candidate for the image capture area. The CPU 61 of the present example further sets, as the candidate area, an area including a point closest to the center of the second pattern among points on a contour line of the first pattern. The center of the second pattern of the present example is the center of the second area. In the present example, the area that can be captured by the image sensor 35 is arranged inside the sewable area 54 by changing the relative position of the embroidery frame 50 mounted on the sewing machine 1 with respect to the image sensor 35. That is, in the present example, the candidate area is set inside the sewable area 54. The CPU 61 of the present example sets, as the candidate area, a rectangular range inside the sewable area 54, within a range obtained by adding a margin to the first area of the first pattern arranged to match the layout of the second pattern when the holding position set at step S23 is the second position. The margin is not provided on the side opposite to the side of the sewable area 54 on which the pattern boundary of the first pattern is present, namely, on the X plus side of the sewable area 54, and is provided on the X minus side, the Y plus side and the Y minus side of the sewable area 54. The size of the margin is a predetermined value M2. The predetermined value M2 may be the same value on the X minus side, the Y plus side and the Y minus side, or may be mutually different values. As shown in FIG. 7, in the first specific example, a candidate area 48 is set that includes a point 75, which is closest to a center 77 of the second pattern 45 among points on the contour line of the first pattern 43. As shown in FIG. 8, in the second specific example, a candidate area 148 is set that includes a point 76, which is closest to a center 78 of the second pattern 145 among points on the contour line of the first pattern 143.

The CPU 61 identifies a maximum image capture range of the image sensor 35 (step S26). The maximum image capture range is set within the image capture range 2 of the image sensor 35 such that it is possible to capture an image of the candidate area set at step S25. Specifically, when the image capture range 2 falls within the candidate area, the image capture range 2 is set as the maximum image capture range. When the size of the image capture range 2 in at least one of the X direction and the Y direction is larger than that of the candidate area, the maximum image capture range is set to be smaller than the image capture range 2 in accordance with the candidate area. As shown in FIG. 7, in the first specific example, the image capture range 2 falls within the candidate area 48. Therefore, the image capture range 2 is set as the maximum image capture range, as it is. As shown in FIG. 8, in the second specific example, the length of the image capture range 2 in the X direction is larger than the length of the candidate area 148 in the X direction. Therefore, a range obtained by changing the length of the image capture range 2 in the X direction to the length of the candidate area 148 in the X direction is set as a maximum image capture range 3.

The CPU 61 arranges the maximum image capture range identified at step S26, by changing its position inside the candidate area, and calculates an extent of a stitching area (an amount of stitches) within the maximum image capture range in each arrangement (step S27). The stitching area is an area that is covered by stitches representing the first pattern, within an area that falls within the maximum image capture range. On the basis of the preview image data generated at step S24, the CPU 61 of the present example calculates, as an index of the extent of the stitching area, the number of pixels representing the stitches, among a plurality of pixels within the maximum image capture range represented by the preview image data. In the first specific example, the CPU 61 calculates the extent of the stitching area in each arrangement when the maximum image capture range is arranged by displacing it by one pixel at a time from an upper portion to a lower portion at the left end inside the candidate area 48 in FIG. 7. When the calculation of the extent of the stitching area is completed to the lower portion of the candidate area 48, then, the CPU 61 displaces the maximum image capture range to the right in FIG. 7 by one pixel. After that, similarly, the CPU 61 displaces the maximum image capture range from the upper portion to the lower portion inside the candidate area 48, and calculates the extent of the stitching area in each arrangement. The CPU 61 repeats the processing until the extent of the stitching area is calculated for all the arrangements that can be set inside the candidate area 48. In the second specific example, the CPU 61 calculates the extent of the stitching area in each arrangement when the maximum image capture range is arranged by displacing it by one pixel at a time from an upper left portion to a lower left portion inside the candidate area 148 in FIG. 8.

The CPU 61 determines whether or not a single position is set as the position of the maximum image capture range for which the extent of the stitching area is the largest among the extents of the stitching areas that are calculated for each maximum image capture range at different positions (step S28). When the number of the positions of the maximum image capture range for which the extent of the stitching area is the largest is one, the CPU 61 may determine that a single position is set as the position of the maximum image capture range for which the extent of the stitching area is the largest. When a difference between the extent of the stitching area at the position of the maximum image capture range for which the extent of the stitching area is the largest, and the extent of the stitching area at the position of the maximum image capture range for which the extent of the stitching area is second largest, is equal to or more than a predetermined value, the CPU 61 may determine that a single position is set as the position of the maximum image capture range for which the extent of the stitching area is the largest. The predetermined value is, for example, a value of a predetermined percentage (for example, 5%) of the maximum value of the extent of the stitching area. In the first specific example, the maximum image capture range for which the extent of the stitching area is the largest is determined as an area 49 shown in FIG. 7 (yes at step S28). In this case, from within the candidate area 48, the CPU 61 identifies, as the image capture area, the area 49 within the maximum image capture range for which the area covered by the stitches representing the first pattern 43 is the most extensive (step S29).

In the second specific example, the number of the maximum image capture ranges for which the extent of the stitching area is the largest is two, i.e., an area 149 and an area 150 (no at step S28). In this case, the CPU 61 calculates a color boundary amount for each of the maximum image capture ranges for which the extent of the stitching area is the largest (step S30). The color boundary amount represents the extent of the area covered by stitches that form the contour of the embroidery pattern, and the extent of the area covered by stitches adjacent to different color stitches. On the basis of the preview image data generated at step S24, the CPU 61 of the present example calculates, as an index of the color boundary amount, a number of pixels representing the stitches that form the contour of the embroidery pattern and pixels representing the stitches adjacent to different color stitches, from among a plurality of pixels represented by the preview image data. The pixels representing the stitches that form the contour in the area 149 are shown by a pixel group 151 in FIG. 8. The pixels representing the stitches that form the contour of the embroidery pattern and the pixels representing the stitches adjacent to different color stitches in the area 150 are shown by a pixel group 152 in FIG. 8. Of the plurality of areas for which the area covered by the stitches representing the first pattern is the most extensive, the CPU 61 identifies, as the image capture area, the area for which the extent of the area covered by the stitches representing the first pattern and forming the contour of the first pattern and the extent of the area covered by the stitches adjacent to different color stitches are the largest (step S31). In the second specific example, the area 150, for which the number of the pixels representing the stitches that form the contour of the embroidery pattern and the pixels representing the stitches adjacent to different color stitches is larger than in the area 149, is identified as the image capture area.

The CPU 61 determines a first image capture position (step S32). The first image capture position is a relative position of the embroidery frame 50 (the sewable area 54) with respect to the image sensor 35, and is used to obtain first image data of the image capture area identified at step S29 or step S31 when the holding position is the first position. In the first specific example, the CPU 61 determines, as the first image capture position, a position to capture an image of the area 49 arranged with respect to the sewable area 54 as shown in FIG. 4. In the second specific example, the CPU 61 determines, as the first image capture position, a position to capture an image of the area 150 arranged with respect to the sewable area 54 as shown in FIG. 4.

The CPU 61 determines a second image capture position (step S33). The second image capture position is a relative position of the embroidery frame 50 (the sewable area 54) with respect to the image sensor 35, and is used to obtain second image data of the image capture area identified at step S29 or step S31 when the holding position is the second position. In the first specific example, the CPU 61 determines, as the second image capture position, a position to capture an image of the area 49 arranged with respect to the sewable area 54 as shown in FIG. 7. In the second specific example, the CPU 61 determines, as the second image capture position, a position to capture an image of the area 150 arranged with respect to the sewable area 54 as shown in FIG. 8. The CPU 61 returns the processing to the main processing in FIG. 5.

Subsequent to step S1, the CPU 61 outputs a movement command to the movement mechanism 40 (step S2). On the basis of the command from the CPU 61, the movement mechanism 40 moves the embroidery frame 50 to the first image capture position determined at step S32 in FIG. 6. The CPU 61 outputs an image capture command to the image sensor 35 (step S3). On the basis of the command from the CPU 61, the image sensor 35 outputs the image data representing an image of the maximum image capture range. The CPU 61 acquires the first image data representing the image capture area identified at step S1 (step S4). By performing the processing at step S3 and step S4, the CPU 61 causes the image sensor 35 to capture a first image representing the image capture area when the holding position is the first position, and acquires the first image data. The CPU 61 extracts feature points (first feature points) from the first image data acquired at step S4 (step S5). The feature points are points, such as end points, intersection points, branch points, bending points and the like, that can be notably observed in the image. A known method can be adopted as a method for extracting the first feature points from the first image data. As an algorism to extract the feature points, it is preferable to use an algorism capable of extraction without depending on enlargement, contraction and rotation of the image data. Examples of the algorism to extract the feature points include Oriented FAST and Rotated BRIEF (ORB), Scale Invariant Feature Transform (SIFT), Speeded-Up Robust Features (SURF) and the like. Since these algorisms are known, a detailed explanation thereof is omitted here. At step S5, when a predetermined number (for example, two) of the feature points cannot be extracted from the first image data, the CPU 61 may return the processing to step S3. The predetermined number may be set, as appropriate, taking positioning accuracy into consideration.

The CPU 61 outputs, to the drive circuit 74, a command to display a preview image on the LCD 15 on the basis of the preview image data generated at step S1 (step S24). Then, the CPU 61 causes the LCD 15 to display the layout of the first pattern with respect to the embroidery frame 50 when the holding position is the second position (step S6). In the first specific example, the image 58 in FIG. 9 is displayed on the LCD 15. In the second specific example, the image 158 in FIG. 10 is displayed on the LCD 15. The user refers to the LCD 15 and, in accordance with the layout displayed in the preview image, changes the holding position with respect to the embroidery frame 50 of the sewing object C on which the first pattern is sewn, from the first position to the second position. When the change of the holding position is completed, the user selects an OK key (not shown in the drawings) displayed on the LCD 15.

The CPU 61 determines whether or not the selection of the OK key has been detected (step S7). The CPU 61 stands by until the selection of the OK key is detected (no at step S7). When the selection of the OK is detected (yes at step S7), the CPU 61 outputs the movement command to the movement mechanism 40 (step S8). On the basis of the command from the CPU 61, the movement mechanism 40 moves the embroidery frame 50 to the second image capture position determined at step S33 in FIG. 6. The CPU 61 outputs the image capture command to the image sensor 35 (step S9). On the basis of the command from the CPU 61, the image sensor 35 outputs the second image data representing a second image that is within the maximum image capture range. The CPU 61 acquires the second image data representing the second image output from the image sensor 35 (step S10). By performing the processing at step S9 and step S10, the CPU 61 causes the image sensor 35 to capture the second image representing the image capture area when the holding position is the second position, and thus acquires the second image data. The second image of the present example is an image obtained by capturing the image capture area identified at step S29 or step S31 when the holding position is the second position. As shown in FIG. 9, in the first specific example, the second image data representing the area 49 is acquired. As shown in FIG. 10, in the second specific example, the second image data representing the area 150 is acquired. Similarly to step S5, the CPU 61 extracts feature points (second feature points) from the second image data acquired at step S10 (step S11). At step S11, when a predetermined number (for example, two) of the feature points cannot be extracted from the second image data, the CPU 61 may return the processing to step S9 or step S6. The predetermined number may be set, as appropriate, taking positioning accuracy into consideration. When the CPU 61 returns the processing to step S6, the CPU 61 may display an error message, such as "Please re-arrange the cloth in accordance with the layout on the screen.", on the LCD 15.

On the basis of the first feature points extracted at step S5 and the second feature points extracted at step S11, the CPU 61 sets the layout of the second pattern with respect to the first pattern when the holding position is the second position (step S12). At step S12, the CPU 61 applies the first feature points and the second feature points to known pattern matching, and thus calculates a movement amount of the first pattern in the second position with respect to the first pattern in the first position. The CPU 61 sets the layout of the second pattern on the basis of the calculated movement amount. The CPU 61 corrects the embroidery data to sew the second pattern in accordance with the layout set at step S12 (step S13). Specifically, the CPU 61 corrects the second data of the embroidery data so as to move and rotate the second pattern in order to arrange the second pattern in accordance with the set layout. When the second pattern is arranged on the sewing object C when the holding position is the second position, if the second pattern is not contained within the sewable area 54, the CPU 61 may display an error message and return the processing to step S6.

The CPU 61 determines whether or not the start/stop switch 29 has been selected and the input of the sewing start command has been detected (step S14). The CPU 61 stands by until the sewing start command is input (no at step S14). When the sewing start command has been detected (yes at step S14), the CPU 61 causes the second pattern to be sewn on the sewing object C in accordance with the embroidery data corrected at step S13 (step S15). In accordance with the corrected embroidery data, the CPU 61 controls the drive circuits 72 and 73 to drive the movement mechanism 40, and thus moves the embroidery frame 50. In synchronization with the drive control of the drive circuits 72 and 73, the CPU 61 drives the drive circuit 71 and drives the needle bar up-and-down movement mechanism 34. Thus, a plurality of stitches representing the second pattern are formed on the sewing object C held by the embroidery frame 50, in accordance with the embroidery data. Thereafter, the sewing machine 1 ends the main processing.

On the basis of the embroidery data, the sewing machine 1 identifies, from within the first area in which the first pattern is sewed, the image capture area within the image capture range 2. The sewing machine 1 captures the first image representing the identified image capture area, and extracts the feature points from the first image data representing the first image. Therefore, in comparison to when a whole image representing the whole of the sewable area 54 is captured and the feature points are extracted from the image data representing the whole image, the sewing machine 1 can shorten a time to acquire the image data, and a time required to extract the feature points. The sewing machine 1 extracts the feature points from each of the first image representing a part of the first pattern, and the second image, and sets the layout of the second pattern with respect to the first pattern. Therefore, there is no need for the user to attach or remove a marker on the sewing object C. The sewing machine 1 corrects the embroidery data on the basis of the second image obtained by capturing a part of the first pattern when the holding position is the second position. Thus, the sewing machine 1 can perform the positioning of the second pattern with respect to the first pattern, on the basis of the actual layout of the first pattern.

The sewing machine 1 causes the image sensor 35 to capture the first image, and acquires the first image data representing the first image. Thus, using the first image representing the first pattern actually sewn on the sewing object C, the sewing machine 1 can perform the positioning more accurately than when an image representing the first pattern included in the embroidery data is used as the first image.

The sewing machine 1 of the present example is provided with the movement mechanism 40 that relatively moves the embroidery frame 50 mounted on the sewing machine 1 with respect to the image sensor 35. The sewing machine 1 determines the first image capture position and the second image capture position. The first image capture position is a position at which the image sensor 35 is caused to capture an image of the image capture area when the holding position is the first position. The second image capture position is a position at which the image sensor 35 is caused to capture an image of the image capture area when the holding position is the second position. Therefore, there is no need for the user to input an image capture position during execution of the processing that determines the layout of the second pattern with respect to the first pattern. The sewing machine 1 uses, as the second image, an image within the image capture range 2 representing the layout of the first pattern when the holding position is the second position. Therefore, in comparison to when an image representing the whole of the area that can be captured by the image sensor 35 is used as the image representing the layout of the first pattern, the sewing machine 1 can shorten a time to acquire the image and an image processing time to extract the feature points from the image.

The embroidery data of the present example includes the pattern image data, which is the image data representing the first pattern. Therefore, there is no need for the sewing machine 1 to generate the pattern image data from the coordinate data. The sewing machine 1 can shorten a processing time to acquire the pattern image data, in comparison to when the pattern image data is generated from the coordinate data representing the positions of the needle drop points to form the plurality of stitches representing the embroidery pattern.

On the basis of the embroidery data, the sewing machine 1 sets an area that is more extensive than the image capture area and that includes a part of the first pattern on the second pattern side, as a candidate area that becomes a candidate for the image capture area, and identifies the image capture area from within the candidate area. Therefore, the sewing machine 1 can shorten a processing time to identify the image capture area, in comparison to when the image capture area is identified from the whole of the sewable area 54.

The sewing machine 1 is provided with the LCD 15 and the detector 36 that outputs the detection signal corresponding to the type of the embroidery frame 50. The sewing machine 1 identifies the type of the embroidery frame 50 on the basis of the detection signal from the detector 36. The sewing machine 1 determines the layout of the second pattern and the first pattern with respect to the embroidery frame 50 when the holding position is the second position, on the basis of the identified type of the embroidery frame 50, the size of the second pattern represented by the embroidery data, and the layout of the second pattern with respect to the first pattern. The sewing machine 1 causes the LCD 15 to display the determined layout of the first pattern with respect to the embroidery frame 50 when the holding position is the second position. The sewing machine 1 sets, as the candidate area, an area which includes a part of the first pattern and which falls within the area that can be captured by the image sensor 35 when the first pattern is arranged with respect to the embroidery frame 50 in accordance with the determined layout. Therefore, the sewing machine 1 can shorten the processing time to identify the image capture area, in comparison to when the image capture area is identified from the whole of the sewable area 54. The sewing machine 1 does not identify, as the image capture area, an area whose image cannot be captured. More specifically, the sewing machine 1 can avoid an occurrence of a situation in which an area whose image cannot be captured is identified as the image capture area, the second image used for the positioning of the second pattern with respect to the first pattern cannot be acquired, and the positioning cannot be performed.

The sewing machine 1 sets, as the candidate area, an area including the point closest to the center of the second pattern among the points on the contour line of the first pattern. The sewing machine 1 can shorten the processing time to identify the image capture area, in comparison to when the image capture area is identified from the whole of the sewable area 54. The sewing machine 1 sets, as the candidate area, an area that is expected to fall within the area that can be captured by the image sensor 35. Therefore, the sewing machine 1 does not identify, as the image capture area, an area whose image cannot be captured.

From within the candidate area, the sewing machine 1 identifies, as the image capture area, an area within the image capture range 2 for which the area covered by the stitches representing the first pattern is the most extensive. From within the candidate area, the sewing machine 1 can identify, as the image capture area, an area that is expected to have a large number of the first feature points extracted from the first image. Therefore, on the basis of the first feature points and the second feature points, the sewing machine 1 can more accurately calculate the layout of the first pattern when the holding position of the sewing object C by the embroidery frame 50 is the second position.

When there are a plurality of areas for which the area covered by the stitches representing the first pattern is the most extensive, the sewing machine 1 identifies, as the image capture area, the area that satisfies the following requirements, from among the plurality of areas for which the area covered by the stitches representing the first pattern is the most extensive. More specifically, the sewing machine 1 identifies, as the image capture area, the area for which the area covered by the stitches representing the first pattern and forming the contour of the first pattern and the area covered by the stitches adjacent to different color stitches are the most extensive. Therefore, from within the candidate area, the sewing machine 1 can identify, as the image capture area, the area that is expected to have a large number of the first feature points extracted from the first image. On the basis of the first feature points and the second feature points, the sewing machine 1 can more accurately calculate the layout of the first pattern when the holding position of the sewing object C by the embroidery frame 50 is the second position.

A sewing machine and a non-transitory computer-readable storage medium of the present disclosure are not limited to the above described embodiment, and various changes may be made without departing from the spirit and scope of the present disclosure. For example, the following modifications (A) to (C) may be added as appropriate.

(A) The configuration of the sewing machine 1 may be changed as appropriate. The sewing machine 1 may be an industrial sewing machine or a multi-needle sewing machine. It is sufficient that an image capture portion be a device capable of capturing an image, and it may be, for example, a line sensor in which a plurality of the image pickup elements 37 are arranged in the main scanning direction. It is sufficient that a movement portion can relatively move the object to be photographed with respect to the image capture portion in a first direction and a direction intersecting the first direction. The movement directions (the first direction, a second direction) of the object to be photographed by the movement portion may be changed as appropriate.

(B) The program including instructions to cause the main processing (refer to FIG. 5) to be executed may be stored in a storage device of the sewing machine 1 until the CPU 61 executes the program. Therefore, an acquisition method of the program, an acquisition route, and the device that stores the program may each be changed as appropriate. The program to be executed by the CPU 61 may be received from another device via a cable or wireless communication, and may be stored in a storage device, such as a flash memory. Examples of the other device include a PC and a server connected via a network.

(C) The respective steps of the main processing (refer to FIG. 5) are not limited to an example in which they are performed by the CPU 61, and a part or all of the steps may be performed by another electronic device (for example, an ASIC). The respective steps of the main processing may be performed through distributed processing by a plurality of electronic devices (for example, a plurality of CPUs). The respective steps of the main processing can be changed in order, omitted or added, as necessary. An aspect in which an operating system (OS) or the like operating on the sewing machine 1 performs a part of all of the main processing on the basis of a command from the CPU 61 is also included in the scope of the present disclosure. For example, the following modifications from (C-1) to (C-5) may be added to the main processing, as appropriate.

(C-1) At step S4, the CPU 61 may acquire the pattern image data included in the embroidery data, as the first image data. In this case, there is no need for the sewing machine 1 to cause the image sensor 35 to acquire the first image in order to acquire the first image data, and it is possible to shorten the processing time. The pattern image data may be generated in accordance with a known method, on the basis of the thread color data and the coordinate data included in the embroidery data. In this case, the embroidery data need not necessarily include the pattern image data. At step S24, the CPU 61 may generate the preview image data on the basis of the pattern image data generated based on the thread color data and the coordinate data.

(C-2) It is sufficient that the detector 36 can detect the type of the embroidery frame 50 mounted on the sewing machine 1, and, for example, the image sensor 35 may also be used. The detector 36 may be omitted from the sewing machine 1, as necessary. The sewing machine 1 may allow the user to input the type of the embroidery frame mounted on the sewing machine 1, and may perform the processing on the basis of the input type of the embroidery frame.

(C-3) It is sufficient that the image capture area be an area which includes at least a part of the first area in which the first pattern has been sewn, and which is within the image capture range 2 in the state in which the holding position is the first position. The method for identifying the image capture area may be changed as appropriate. When identifying the image capture area, the CPU 61 need not necessarily set the candidate area. In this case, for example, the CPU 61 may identify, as the image capture area, an area (within the image capture range 2) which includes the point closest to the center of the second pattern among the points on the contour line of the first pattern, and for which the area covered by the stitches of the first pattern is the most extensive. The CPU 61 need not necessarily set the margin when setting the candidate area. The candidate area need not necessarily include the point closest to the center of the second pattern among the points on the contour line of the first pattern. The CPU 61 need not necessarily identify the maximum image capture range at step S26.

In the processing at step S27 and step S28, the CPU 61 may acquire, as the amount of stitches, another index indicating the extent of the area covered by the stitches, such as a number of stitches, a thread density and the like identified on the basis of the embroidery data, and may identify the image capture area on the basis of the acquired index. In the processing at step S27 and step S28, the CPU 61 may calculate a thread boundary amount, instead of the amount of stitches, and may identify an area for which the calculated thread boundary amount is the largest, as the image capture area. When there are a plurality of areas for which the extent of the area covered by the stitches is the largest, the CPU 61 may use another method to identify the image capture area, from among the plurality of areas for which the extent of the area covered by the stitches is the largest. Examples of the other method include a random selection method, a selection method based on the layout, and a method for selecting an area for which it is determined that there are a large number of feature points, from an analysis result of the pattern image data.

(C-4) The sewing machine 1 may omit the processing that determines at least one of the first image capture position and the second image capture position. In this case, for example, the sewing machine 1 may display an image showing the layout of the image capture area identified at step S29 or step S31 in the first pattern on the LCD 15, and may allow the user to input the image capture position to capture an image of the position of the image capture area. When the second image capture position is not determined, the sewing machine 1 may acquire, as the second image, an image obtained by capturing the whole of the area that can be captured by the image sensor 35, or may acquire, as the second image, an image obtained by capturing an area, except the second area, within the area that can be captured.

(C-5) The pattern boundary need not necessarily be set to be parallel to the X direction or the Y direction. The method for setting the first pattern and the center of the second pattern may be changed as appropriate. The direction of the second pattern with respect to the first pattern in the embroidery coordinate system may be changed as appropriate. The area that can be captured by the image sensor 35 may be changed as appropriate. For example, the area that can be captured may be an area larger than the sewable area.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A sewing machine comprising:
an embroidery frame configured to hold a sewing object;
an image capture portion having a predetermined image capture range;
a processor; and
a memory configured to store computer-readable instructions that, when executed by the processor, instruct the processor to perform processes comprising:
acquiring embroidery data representing an embroidery pattern, the embroidery pattern including a first pattern and a second pattern, the first pattern being a pattern that is sewn in a state in which a holding position of the sewing object held by the embroidery frame is a first position, and the second pattern being a pattern that is sewn subsequent to the first pattern in a state in which the holding position is a second position different from the first position;
identifying, as an image capture area, an area which includes at least a part of a first area and which is within the image capture range in the state in which the holding position is the first position, the first area being an area in which the first pattern is sewn on the basis of the acquired embroidery data;
causing the image capture portion to capture a first image representing the identified image capture area;
acquiring first image data representing the first image;
extracting a first feature point from the acquired first image data;
causing the image capture portion to capture a second image of the sewing object when the holding position is the second position after the first image data has been acquired;
acquiring second image data representing the second image;
extracting a second feature point from the acquired second image data;
setting, on the basis of the first feature point and the second feature point, a layout of the second pattern with respect to the first pattern when the holding position is the second position;
correcting the embroidery data to sew the second pattern in accordance with the set layout; and
sewing the second pattern on the sewing object on the basis of the corrected embroidery data.

2. The sewing machine according to claim 1, wherein
the setting the layout of the second pattern comprises calculating a movement amount of the first pattern when the holding position is the second position with respect to the first pattern when the holding position is the first position by pattern matching on the basis of the first feature point and the second feature point, and setting the layout of the second pattern with respect to the first pattern when the holding position is the second position on the basis of the calculated movement amount.

3. The sewing machine according to claim 1, further comprising:
a movement portion configured to relatively move the embroidery frame, which is mounted on the sewing machine, with respect to the image capture portion,
wherein
the computer-readable instructions further instruct the processor to perform processes comprising:
determining a first image capture position and a second image capture position, the first image capture position being a relative position of the image capture portion with respect to the embroidery frame when the image capture area is captured by the image capture portion when the holding position is the first position, and the second image capture position being a relative position of the image capture portion with respect to the embroidery frame when the image capture area is captured by the image capture portion when the holding position is the second position;
moving the embroidery frame to the first image capture position by driving the movement portion; and
moving the embroidery frame to the second image capture position by driving the movement portion after the acquiring of the first image data,
wherein the acquiring of the first image data comprises acquiring the first image data by causing the image capture portion to capture the first image representing the image capture area after the moving of the embroidery frame to the first image capture position, and the acquiring of the second image data comprises acquiring the second image data by causing the image capture portion to capture the second image representing the image capture area after the moving of the embroidery frame to the second image capture position.

4. The sewing machine according to claim 1, wherein
the embroidery data includes pattern image data and coordinate data, the pattern image data being image data representing the first pattern, and the coordinate data representing a layout of the second pattern with respect to the first pattern and positions of needle drop points to form stitches of the embroidery pattern,
the identifying the image capture area comprises identifying the image capture area on the basis of the pattern image data and the layout of the second pattern with respect to the first pattern, and
the sewing of the second pattern comprises sewing the embroidery pattern on the basis of the coordinate data.

5. The sewing machine according to claim 1, wherein
the computer-readable instructions further instruct the processor to perform a process comprising:
setting, on the basis of the embroidery data, an area which is more extensive than the image capture area and which includes a part of the first pattern on the second pattern side, as a candidate area that becomes a candidate for the image capture area, and
wherein the identifying the image capture area comprises identifying the image capture area from within the candidate area.

6. The sewing machine according to claim 5, further comprising:
a display portion,
wherein
the computer-readable instructions further instruct the processor to perform processes comprising:
identifying a type of the embroidery frame;
setting a layout of the second pattern and a layout of the first pattern with respect to the embroidery frame when the holding position is the second position, on the basis of the identified type of the embroidery frame, a size of the second pattern represented by the acquired embroidery data, and the layout of the second pattern with respect to the first pattern; and
displaying, on the display portion, the set layout of the first pattern with respect to the embroidery frame when the holding position is the second position,
wherein the setting the candidate area comprises setting, as the candidate area, an area which includes a part of the first pattern and which falls within an area capable of being captured by the image capture portion when the first pattern is arranged with respect to the embroidery frame in accordance with the set layout.

7. The sewing machine according to claim 5, wherein
the setting the candidate area comprises setting, as the candidate area, an area including a point that is closest to a center of the second pattern among points on a contour line of the first pattern.

8. The sewing machine according to claim 5, wherein
the identifying the image capture area comprises identifying, as the image capture area, an area within the image capture range for which a range covered by stitches representing the first pattern is most extensive, from within the candidate area.

9. The sewing machine according to claim 8, wherein
the embroidery data includes color thread data representing a color of an upper thread used to sew the embroidery pattern, and
when there are a plurality of areas for which the range covered by the stitches representing the first pattern is most extensive, the identifying the image capture area comprises identifying, as the image capture area, an area for which a range covered by stitches representing the first pattern and forming a contour of the first pattern, and a range covered by stitches adjacent to different color stitches are most extensive, from among the plurality of areas for which the range covered by the stitches representing the first pattern is most extensive.

10. A non-transitory computer-readable medium storing computer-readable instructions that are executed by a processor provided in a sewing machine comprising an embroidery frame to hold a sewing object and an image capture portion having a predetermined image capture range, the computer-readable instructions, when executed, instructing the processor to perform processes comprising:
acquiring embroidery data representing an embroidery pattern, the embroidery pattern including a first pattern and a second pattern, the first pattern being a pattern that is sewn in a state in which a holding position of the sewing object held by the embroidery frame is a first position, and the second pattern being a pattern that is sewn subsequent to the first pattern in a state in which the holding position is a second position different from the first position;
identifying, as an image capture area, an area which includes at least a part of a first area and which is within the image capture range in the state in which the holding position is the first position, the first area being an area in which the first pattern is sewn on the basis of the acquired embroidery data;
causing the image capture portion to capture a first image representing the identified image capture area;
acquiring first image data representing the first image;
extracting a first feature point from the acquired first image data;
causing the image capture portion to capture a second image of the sewing object when the holding position is the second position after the first image data has been acquired;
acquiring second image data representing the second image;
extracting a second feature point from the acquired second image data;
setting, on the basis of the first feature point and the second feature point, a layout of the second pattern with respect to the first pattern when the holding position is the second position:
correcting the embroidery data to sew the second pattern in accordance with the set layout; and
sewing the second pattern on the sewing object on the basis of the corrected embroidery data.

* * * * *